Sept. 11, 1923.
S. DIGGLE
1,467,610
TANK CONSTRUCTION
Filed July 20, 1921
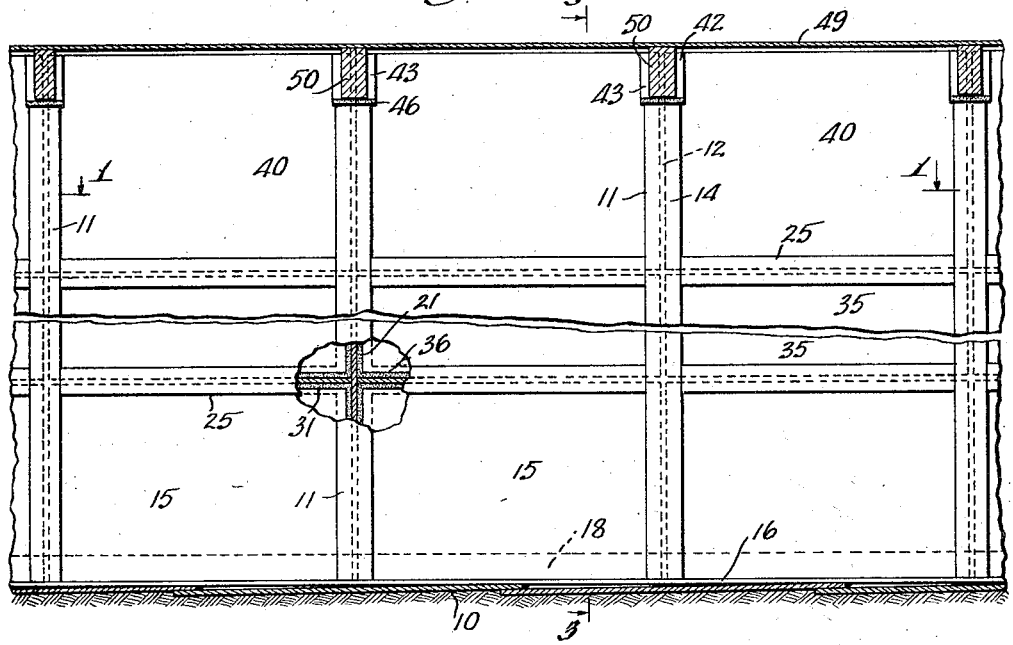
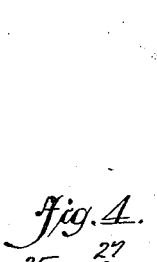
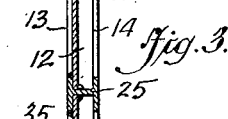
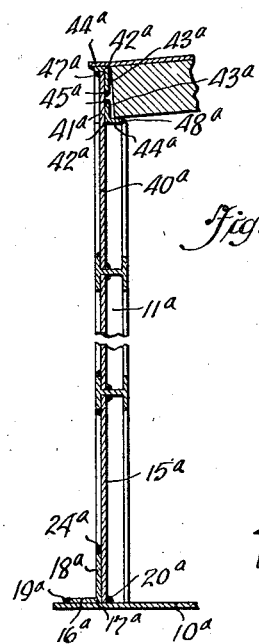
INVENTOR
Samuel Diggle
BY
ATTORNEYS Patented Sept. 11, 1923.

1,467,610

UNITED STATES PATENT OFFICE.

SAMUEL DIGGLE, OF BAYONNE, NEW JERSEY.

TANK CONSTRUCTION.

Application filed July 20, 1921. Serial No. 486,075.

*To all whom it may concern:*

Be it known that I, SAMUEL DIGGLE, a subject of the King of Great Britain, and a resident of Bayonne, in the county of Hudson and State of New Jersey, have invented a new and Improved Tank Construction, of which the following is a full, clear, and exact description.

This invention has relation to an improvement in the construction of tanks, tank cars, boilers, stills, or other similar containers for liquids, fluids, vapors or gases.

Under the present methods and practices of constructing containers of the above recited characters, it is only possible to obtain a pressure resistance equivalent to the maximum strength of the plate members employed in the structure, which strength is materially decreased in riveted and bolted construction, by necessarily employing a jointing method which is of less strength value than the members joined by this method, and which therefore reduces the inherent strength of the plate members to the value of the strength actually residing in the joint areas.

The present invention contemplates and aims to provide a construction which materially increases the pressure load resistance, which reduces the areas of the plate members and segregates the same, which relieves the walls or sides from the roof load stresses, which facilitates the process of welding the elements together, and which effects an economy both in materials and labor, while at the same time increasing the efficiency of the structure.

As a further object and advantage, the invention provides a means for temporarily holding the members to be welded in such positions of desired finality as to eliminate relative opposing strain between the members, while the process of welding is being accomplished, thus allowing the contraction and subsequent expansion required in the act of welding to function naturally and without retaining unnatural crystalline stresses while the metal is resuming its original area.

A further object and advantage of the invention resides in the provision of a tank construction in which the plate areas are independent of each other in order that a fault or rupture developing in one plate will not be infectious or be transmitted to the adjoining plates as is the case in the present structures.

A further advantage of the invention resides in the provision of a construction in which all of the horizontal reinforcing members are of a homogeneous unitary or integral nature and circumferentially arranged to constitute in effect a belt of great strength around the structure.

The invention further contemplates a tank of a non-perforated structure which includes no primary apertures or piercings and hence has no eventual ones either, which may result in leakage or which will eventually require filling or calking for the prevention of leakage.

As a further improvement the invention provides a structure in which the weld at each joint is of a dual nature whereby each weld seam is protected by a complementary weld seam disposed on the opposite surface of the welded element to insure the structure against leakage and which owing to its unbroken metallic contact renders the same immune from the effects of lightning.

By employing the present structure and its method of construction, it is not necessary to lay out, punch, or ream in the shop before transporting the materials to the location where the erection is to be performed and during the erection the two operations of riveting and calking are obviated, thereby replacing by one operation i. e., welding, the five separate operations heretofore mentioned.

To further illustrate the economy of the erection, it is possible to fabricate and complete portions or units of the wall members on the ground before assembling the same, and finally assembling the units which have been previously connected.

To sum up the foregoing improvements and advantages it will be found that the present invention has the effect to produce a tank or a similar container which is more efficient as a tank or container, more efficient as a structure, can be constructed quicker and at a less cost than is obtainable by the present practices and methods, and which when completed further effects a continuous economy by requiring less up-keep and by the carrying of a lower rate of insurance.

With the above recited and other objects and advantages in view, the invention resides in the novel method, construction, combination and arrangement of parts set forth in the following specification, particularly pointed out in the appended claims and illustrated in the accompanying drawings, it being understood that the right is reserved to embodiments other than those actually illustrated herein to the full extent indicated by the general meaning of the terms in which the claims are expressed and by variations in the phraseology of the same.

In the drawing—

Figure 1 is a fragmentary sectional plan view through a tank or container constructed in accordance with the invention, said section being taken on a line approximately as indicated by 1—1 of Fig. 2.

Fig. 2 is a fragmentary vertical sectional view of the tank as viewed from the interior, parts being broken away and shown in section and disclosing the underlying structure.

Fig. 3 is a vertical fragmentary transverse section taken approximately on the line indicated at 3—3 of Fig. 2.

Fig. 4 is a fragmentary perspective view of one of the horizontal supporting beams.

Fig. 5 is a vertical fragmentary transverse sectional view similar to Fig. 3, illustrating a modified adaptation of the invention.

Referring to the drawings by characters of reference the tank or container consists of a bottom 10 constructed in any desired manner, to which the upright supporting members 11 are attached, the same being preferably arranged in a circular or annular series. The upright members may be either constructed of T or I-beams, the same being here illustrated as I-beams having a central web 12 and inner and outer flanges 13 and 14. In setting up the tank the webs 12 of the uprights 11 are disposed radially with respect to the axial center of the tank thereby arranging the flanges 13 at a right angle thereto or substantially circumferential. The lower row or series of plates 15 are next inserted respectively between each adjacent uprights with their bottom edges resting on the horizontal flange 16 of the angle member 17 interposed between each adjacent pair of uprights with the vertical flanges 18 thereof disposed in alignment with the outer flange 13 of the upright and abutting the same at its opposite ends. The outer surface of the plates 15 adjacent the edges thereof are brought in abutting relation to the inner faces of the outer flanges 13 of the uprights and the inner faces of the vertical flanges 18 of the angle members. The inner edge of the horizontal flange 16 of the angle members are welded to the bottom as at 19 and the lower edges of the plates 15 are welded as at 20 to the horizontal flange 16 and the side edges of the plates are welded to the webs 12 as at 21. The outer surface of each plate adjacent its side edge or end is welded as at 22 to the outer flange 13. The outer corner of the angle members 17 are welded as at 23 to the bottom, and the upper edges of the vertical flanges 18 of the angle members are welded as at 24 to the outer surface of the plates 15. The next step in the erection of the tank consists in the application of the horizontal I or T-beam members 25 which are provided with a central web 26 and the inner and outer flanges 27 and 28. The inner and outer flanges of the horizontal members 25 are cut away a distance from the opposite ends of the web to permit the extended portion 29 of the web to be snugly received by the space defined by the flanges 13 and 14 and the web 12 of the uprights. The members 25 are inserted between each adjacent pair of uprights and the lower edges of the outer flanges 27 thereof are welded as at 30 to the outer face of the plates 15 adjacent their upper edges. The underside of the webs 26 are welded as at 31 to the upper inner edge of the plates 15, as clearly illustrated in Fig. 3. By this arrangement it will be seen that each plate is individually framed by the upright at its opposite ends, by the horizontal beams 25 at its upper end and by the angle member 17 at its lower end. It will be further noted that the juncture of the plate with the framing member is sealed thereto by a dual weld as at 20 and 24, 30 and 31, or 21 and 22, likewise the angle member is dually welded to the bottom at 19 and 23 which insures the tank against leakage. The next step in the erection of the tank consists in inserting the next row or series of plates 35 which are welded at their lower inner edges as at 36 to the upper side of the webs 26 and at their outer lower edge to the upper edge of the flanges 27 as at 37 and likewise at their ends and top to the next series of horizontal members 25; the succeeding intermediate plates and horizontal members 25 are similarly associated. The final top-most plates 40 are then inserted, the same being welded and associated at their lower and side edges to the horizontal and upright members as previously set forth. Preferably the upper edges extend above the upper ends of the uprights 11 as at 41 and a substantially Z-shaped member 42 having a vertical web 43 and oppositely disposed outer and inner right angular flanges 44 and 45 is supported by its flange 45 from the upper end of the upright with the flange 44 extending over the upper portion 41 of the upper plates 40. In this instance the inner edge of the flange 45 is welded as at 46 to the upper end of the upright and the upper edge of the plate 40 is welded as at 47 to the outer under edge of the flange 44, which flange in turn is welded as at 48 to the under outer edge of the roof 49. The rafters 50 are supported at their outer ends by the flange 45 which in turn is supported by the upright 11 thereby impinging the roof load and stresses directly on the uprights 11 in order to relieve the walls or sides of the tank from said loads or stresses. The Z-shaped members 43 serve to close the open spaces between the side edges of the portions 41 of the adjacent upper plates 40 as will be clearly understood from the drawing. Where T-beams are employed in lieu of the I-beams for the upright and horizontal members 11 and 25, the webs thereof will be disposed inwardly and the flanges outwardly.

In the modified adaptation of the invention illustrated in Fig. 5 the angle member 17$^a$ is arranged with its horizontal flange 16$^a$ disposed outwardly of the tank and the inner face of its vertical flange 18$^a$ in contact with the outer face of the plate 15$^a$. In this instance the inner bottom edge of the plate is welded as at 20$^a$ to the bottom 10$^a$, while the outer edge of the flange 16$^a$ is welded as at 19$^a$ to the bottom and the upper edge of the flange 18$^a$ is welded as at 24$^a$ to the plate thereby employing three points of welding only in lieu of four as in the first embodiment. Also in this adaptation of the invention, a pair of angle strips 42$^a$ are employed in lieu of the single Z-shaped member 42, one being disposed at the upper edge of the upper plate 40$^a$ with its flange 44$^a$ disposed outwardly and the other with its horizontal flange 44$^a$ disposed inwardly. The vertical flanges 43$^a$ of each angle member are welded at their edges as at 45$^a$ to the inner side of the upper portion 41$^a$ of the plate, while the flange 44$^a$ is welded as at 47$^a$ to the upper edge of the plate. The edge of the horizontal flange 44$^a$ of the lower angle member is welded as at 48$^a$ to the upper end of the upright 11$^a$. It is, of course, obvious that various other changes and modifications in the structure may be made, providing the same fall within the scope of the appended claims.

Having thus described my invention, what I claim is:

1. A fabricated tank wall structure including individual plate members and a frame structure consisting of vertical beams comprising radially disposed webs having laterally projecting flanges at the outer edges thereof, and horizontal beams comprising webs provided respectively with vertically upstanding and depending flanges at the outer edges thereof, said horizontal beams arranged in vertically spaced relation between the vertical beams to define therewith individual framing spaces for the reception of the plate members between the webs of said beams and with the outer surfaces of the edges of the plates abutting the flanges of the beams.

2. A fabricated tank wall structure including individual plate members and a frame structure consisting of vertical beams comprising radially disposed webs having laterally projecting flanges at the outer edges thereof, and horizontal beams comprising webs provided respectively with vertically upstanding and depending flanges at the outer edges thereof, said horizontal beams arranged in vertically spaced relation between the vertical beams to define therewith individual framing spaces for the reception of the plate members between the webs of said beams and with the outer surfaces of the edges of the plates abutting the flanges of the beams, said plates being welded exteriorly at their juncture with the beam flange edges and welded interiorly at their juncture with the web to provide a double seal for each plate.

3. A fabricated tank wall structure including individual plate members and a frame structure consisting of vertical I-beams having their webs disposed radially from the center of the tank structure and horizontal I-beams having their webs disposed horizontally, said latter means being arranged in vertically spaced relation between the vertical beams to afford channeled individual framing units for the reception of the plate members.

4. A fabricated tank wall structure including individual plate members and a frame structure consisting of vertical I-beams having their webs disposed radially from the center of the tank structure and horizontal I-beams having their webs disposed horizontally, said latter means being arranged in vertically spaced relation between the vertical beams to afford channeled individual framing units for the reception of the plate members, said plate members being welded exteriorly at their juncture with the beam flange edges and welded interiorly at their juncture with the beam webs to provide a double seal extending around each plate member.

5. In a fabricated tank wall structure, an annular series of spaced upright beams having radially disposed webs and circumferentially projecting flanges from the opposite sides of the outer edges of the webs, horizontally disposed vertically spaced beams arranged between the upright beams having horizontally disposed webs and vertical depending and upstanding flanges at the outer edges of said webs and plate members, said upright and horizontal beams defining individual receiving spaces between their webs within which the plate members are arranged, the said flanges of said beams constituting abutments with which the outer surface of the edges of the plates engage and coact.

6. In a fabricated tank wall construction, an annular series of spaced upright beams having radially disposed webs and laterally disposed outer flanges, horizontally arranged vertically spaced beams between the upright beams having horizontally disposed webs and vertically upstanding and depending flanges at their outer ends, said upright and horizontal beams providing framing units, and plate members adapted to be individually received by the framing units in the entrant angle formed at the juncture of the webs and flanges of said beams.

7. In a fabricated tank wall construction, an annular series of spaced upright beams having radially disposed webs and laterally disposed outer flanges horizontally arranged vertically spaced beams between the upright beams having horizontally disposed webs and vertically upstanding and depending flanges at their outer ends, said upright and horizontal beams providing framing units, and plate members adapted to be individually received by the framing units in the entrant angle formed at the juncture of the webs and flanges of said beams, said plate members being welded at their inner sides to the webs and at their outer sides to the flanges to provide a double seal.

SAMUEL DIGGLE.